United States Patent [19]
Pfleiderer et al.

[11] 3,875,168
[45] Apr. 1, 1975

[54] 7-AMINO-DECAHYDRO-QUINOLINES

[75] Inventors: Wolfgang Pfleiderer, Konstanz, Germany; Helmut Zondler, Allschwil, Switzerland

[73] Assignee: Ciba-Geigy Corp., Ardsley, N.Y.

[22] Filed: Mar. 26, 1973

[21] Appl. No.: 345,154

[30] Foreign Application Priority Data
Apr. 4, 1972 Switzerland................. 4895/72

[52] U.S. Cl. ........ 260/288 R, 260/47 R, 260/47 EC, 260/260, 260/283 SY, 260/309.5, 260/348 R, 260/464, 260/465.5, 260/465.6, 260/690
[51] Int. Cl............................................. C07d 33/52
[58] Field of Search ................. 260/288 R

[56] References Cited
UNITED STATES PATENTS
3,015,661  1/1962  Georgian................... 260/289 R
3,459,755  8/1969  Mathison et al. ............... 260/288 R Primary Examiner—Donald G. Daus
Assistant Examiner—Mary C. Vaughn
Attorney, Agent, or Firm—Vincent J. Cavalieri

[57] ABSTRACT

The new 7-amino-decahydro-quinolines are manufactured by hydroxygenating 5-amino-2-($\beta$-cyanoethyl)-5-cyclohexen-1-one in a manner which is in itself known. The 5-amino-2-($\beta$-cyanoethyl)-5-cyclohexen-1-ones used as the starting substances can be obtained by several reactions, which are disclosed by several publications. One reaction is the cyclisation of cyanoethylated aliphatic ketones in the presence of suitable catalysts. The new 7-amino-decahydro-quinolines represent valuable curing agents for epoxide resins and advantageously 0,5 to 1,3 equivalents of nitrogen-bonded active hydrogen atoms of the 7-amino-decahydro-quinolines are used per 1 equivalent of epoxide groups of the polyepoxide compound.

4 Claims, No Drawings

7-AMINO-DECAHYDRO-QUINOLINES

The present invention relates to new 7-amino-decahydro-quinolines of the general formula

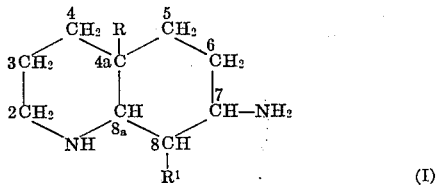

in which R denotes hydrogen or an optionally substituted alkyl radical with 1 to 5 C atoms and $R^1$ denotes methyl or hydrogen.

Preferably, in the formula (I) the radical R represents hydrogen, the methyl group or the γ-aminopropyl group; that is to say, 7-amino-decahydro-quinoline, 7-amino-4a-methyl-decahydro-quinoline and 7-amino-4a-(γ-aminopropyl)-decahydro-quinoline represent three preferred forms of the invention.

The 7-amino-decahydro-quinolines of the formula (I) are manufactured, according to the invention, by hydrogenating a 5-amino-2-(β-cyanoethyl)-5-cyclohexen-1-one of the formula

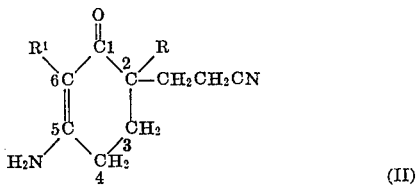

in which R and $R^1$ have the above meaning, in a manner which is in itself known.

The hydrogenation is preferably carried out in the presence of a catalyst. Raney nickel or Raney cobalt are particularly effective as hydrogenation catalysts. It is also possible to use a cobalt oxide catalyst on a suitable carrier material, the catalyst being reduced to cobalt metal catalyst in a stream of hydrogen.

Further possible hydrogenation catalysts are catalysts based on platinum and based on palladium, which can be employed as platinum black or palladium black, as colloidal platinum or palladium, or as platinum oxide or hydroxide or palladium oxide or hydroxide catalysts. Possible carriers for such catalysts are the customary materials such as asbestos, pumice, kieselguhr, silica gel, silicic acid, active charcoal and the sulphates, carbonates or oxides of the metals of group II to VIII of the periodic system, especially of magnesium, calcium, barium, zinc, aluminium, iron, chromium and zirconium.

Preferably, very finely divided nickel or cobalt (Raney nickel or Raney cobalt) or Raney nickel of low palladium content are used.

The hydrogenation can be carried out according to the methods customary in the laboratory and in industry, either without the use of pressure, for example in a duck-shaped shaking vessel, or under pressure in an autoclave.

Solvents which can be used in the hydrogenation are the organic solvents usually employed together with the abovementioned types of catalyst, especially alcohols or ethers, such as methanol, ethanol and dioxane.

Catalytic reduction is as a rule carried out by mixing the suspension or solution of the particular 5-amino-2-(β-cyanoethyl)-5-cyclohexen-1-one with the catalyst and passing hydrogen gas into the reaction mixture. The hydrogenation can in principle be carried out under atmospheric pressure and at room temperature but elevated pressures of 50 atmospheres and above, and elevated reaction temperatures in the range of 50° to 150°C are preferred. The hydrogenation is continued until no further hydrogen is absorbed. After completion of the hydrogenation the catalyst is removed, for example by filtration, and the solvent is distilled off.

The hydrogenation can also be carried out in accordance with other known methods, for example by treatment with alkali metals, such as metallic sodium, in alcoholic solution.

Examples of possible starting substances for the process according to the invention are the following 5-amino-2-(β-cyanoethyl)-5-cyclohexen-1-ones of the formula (II): 5-amino-2-methyl-2-(β-cyanoethyl)-cyanoethyl)-5-cyclohexen-1-one, 5-amino-2,2-bis-(β-cyanoethyl)-cyanoethyl)-5-cyclohexen-1-one and 5-amino-2-(β-cyanoethyl)-5-cyclohexen-1-one.

The 5-amino-2-(β-cyanoethyl)-5-cyclohexen-1-ones of the formula (II) used as starting substances in each case can be manufactured according to various processes depending on the meaning which R has in this formula. If R denotes an optionally substituted alkyl radical with 1 to 5 C atoms, that is to say, for example, the methyl group or a β-cyanoethyl group, it is possible to use known processes in which cyanoethylated aliphatic ketones are cyclised in the presence of suitable catalysts. Such processes are described, for example, in the following publications: "Zur Cyclisierung cyanathylierter aliphatischer Ketone" ("On the Cyclisation of Cyanoethylated Aliphatic Ketones") by M. Cherubim and F. A. Dagga, Angew. Chem. 83 (1971) 896 and "Behavior of δ-Ketonitriles Under the Conditions of Basic Catalysis" by T. A. Favorskaya et. al., Journal of Organic Chemistry of the USSR (1969), Vol. 5, No. 7, 1,165–1,166.

The cyanoethylated aliphatic ketones can as a rule be manufactured in good yields by a direct addition reaction of acrylonitrile with ketones such as, for example, acetone or methyl ethyl ketone. Thus, the addition reaction of 2 molecules of acrylonitrile with methyl ethyl ketone leads to 4-acetyl-4-methyl-pimelonitrile, whilst the addition reaction of 3 molecules of acrylonitrile with acetone leads to 1,1,1-tris-(β-cyanoethyl)-2-propanone.

The 5-amino-2-(β-cyanoethyl)-5-cyclohexen-1-one used as the starting product for the present process according to the invention can be manufactured by cyclisation of 3,3-bis-(β-cyanoethyl)-pentane-2,4-dione with simultaneous splitting off of an acetyl group, in the presence of alkaline catalysts such as, for example, sodium alcoholate. 3,3-Bis-(β-cyanoethyl)-pentane-2,4-dione can be manufactured according to a known process, in a simple manner, by cyanoethylation of acetylacetone in the presence of bases. The procedure is described by G. S. Misra and R. S. Asthana in Liebigs Annalen 609 (1957) 240–246.

A special manufacturing process for 2,6-dimethyl-3-amino-6-(β-cyanoethyl)-cyclohexen-2-one is described in German Auslegeschrift No. 2,010,124. Diethyl ketone is reacted with acrylonitrile in a tertiary alcohol and in the presence of aqueous alkali metal hydroxide or alkali metal alcoholate as the catalyst.

The 7-amino-decahydro-quinolines of the formula (I), according to the invention, represent valuable curing agents for epoxide resins.

Hence, the invention also relates to curable mixtures which are suitable for the manufacture of mouldings, impregnations, coatings and adhesive bonds and which are characterised in that they contain (a) a polyepoxide compound with an average of more than one epoxide group in the molecule, and (b) as the curing agent, a 7-amino-decahydro-quinoline of the formula (I).

Appropriately, 0.5 to 1.3 equivalents, preferably approx. 1.0 equivalent, of nitrogen-bonded active hydrogen atoms of 7-amino-decahydro-quinoline of the formula (I) are used per 1 equivalent of epoxide groups of the polyepoxide compound (a).

Possible polyepoxide compounds (a) are above all those with an average of more than one glycidyl group, β-methylglycidyl group or 2,3-epoxycyclopentyl group bonded to a hetero-atom (for example sulphur and preferably oxygen or nitrogen); in particular, there may be mentioned bis-(2,3-epoxycyclopentyl)-ether; diglycidylethers and polyglycidyl-ethers of polyhydric aliphatic alcohols, such as 1,4-butanediol, or polyalkylene glycols, such as polypropylene glycols; diglycidyl-ethers or polyglycidyl-ethers of cycloaliphatic polyols such as 2,2-bis-(4-hydroxycyclohexyl)-propane; diglycidyl-ethers or polyglycidyl-ethers of polyhydric phenols, such as resorcinol, bis-(p-hydroxyphenyl)methane, 2,2-bis(p-hydroxyphenyl)-propane (= diomethane), 2,2-bis(4'-hydroxy-3',5'-dibromophenyl)propane, 1,1,2,2-tetrakis-(p-hydroxylphenyl)-ethane or of condensation products, obtained under acid conditions, of phenols with formaldehyde, such as phenol novolacs and cresol novolacs; di- and poly-(β-methylglycidyl)-ethers of the above-mentioned polyhydric alcohols or polyhydric phenols; polyglycidyl esters of polybasic carboxylic acids, such as phthalic acid, terephthalic acid, $\Delta^4$-tetrahydrophthalic acid and hexahydrophthalic acid; N-glycidyl derivatives of amines, amides and heterocyclic nitrogen bases, such as N,N-diglycidylaniline, N,N-diglycidyl-toluidine and N,N,N',N'-tetraglycidyl-bis(p-aminophenyl)-methane; triglycidyl-isocyanurate; N,N'-diglycidylethyleneurea; N,N'-diglycidyl-5,5-dimethylhydantoin and N,N'-diglycidyl-5-isopropylhydantoin; N,N'-diglycidyl-5,5-dimethyl-6-isopropyl-5,6-dihydro-uracil.

If desired, active diluents such as, for example, styrene oxide, butyl-glycidyl-ether, isooctyl-glycidylether, phenyl-glycidyl-ether, cresyl-glycidyl-ether and glycidyl esters of synthetic highly branched mainly tertiary aliphatic monocarboxylic acids ("CARDURA E") can be added to the polyepoxides to lower the viscosity.

The curing of the curable mixtures according to the invention to give mouldings and the like is appropriately carried out in the temperature range of 20° to 160°C. The curing can also be carried out in two or more stages in a known manner, with the first curing stage being carried out at a lower temperature and the post-curing at a higher temperature.

If desired, the curing can also be carried out in two stages by first prematurely stopping the curing reaction or carrying out the first stage at room temperature or only slightly elevated temperature, whereby a curable pre-condensate which is still fusible and soluble (a so-called "B-stage") is obtained from the epoxide component (a) and the amine curing agent (b). Such a pre-condensate can serve, for example, for the manufacture of "pre-pregs," compression moulding compositions or, especially, sintering powders.

In order to shorten the gelling times and/or curing times, it is possible to add known accelerators for the amine curing reaction, for example monophenols or polyphenols, such as phenol or diomethane, salicylic acids, tertiary amines or salts of thiocyanic acid, such as NH$_4$SCN.

The term "curing," as used here, denotes the conversion of the soluble, either liquid or fusible, polyepoxides into solid, insoluble and infusible, threedimensionally cross-linked products or materials, and in particular, as a rule, with simultaneous shaping to give mouldings, such as castings, pressings, laminates and the like or "sheet-like structures" such as coatings, lacquer films or adhesive bonds.

The curable mixtures according to the invention of polyepoxide compounds (a) and 7-amino-decahydro-quinolines of the formula (I) as curing agents can furthermore be mixed, in any stage before curing, with customary modifiers such as extenders, fillers and reinforcing agents, pigments, dyestuffs, organic solvents, plasticisers, flow control agents, agents for controlling thixotropy, flame-proofing substances and mould release agents.

As examples of extenders, reinforcing agents, fillers and pigments which can be employed in the curable mixtures according to the invention, there may be mentioned: coal tar, bitumen, textile fibres, glass fibres, asbestos fibres, boron fibres, carbon fibres, cellulose, polyethylene powder and polypropylene powder; quartz powder; mineral silicates, such as mica, asbestos powder and slate powder; kaolin, aluminium oxide trihydrate, chalk powder, gypsum, antimony trioxide, bentones, silica aerogel ("AEROSIL"), lithopone, baryte, titanium dioxide, carbon black, graphite, oxide pigments, such as iron oxide, or metal powders, such as aluminium powder or iron powder.

Suitable organic solvents for modifying the curable mixtures are, for example, toluene, xylene, n-propanol, butyl acetate, acetone, methyl ethyl ketone, diacetone-alcohol, ethylene glycol monomethyl ether, monoethyl ether and monobutyl ether.

As plasticisers for modifying the curable mixtures it is possible to employ, for example, dibutyl phthalate, dioctyl phthalate and dinonyl phthalate, tricresyl phosphate, trixylenyl phosphate and also polypropylene glycols.

As flow control agents when employing the curable mixtures especially in surface protection, it is possible to add, for example, silicones, cellulose acetobutyrate, polyvinyl butyral, waxes, stearates and the like (which in part are also used as mould release agents).

Especially for use in the lacquer field, the polyepoxide compounds can furthermore be partially esterified in a known manner with carboxylic acids, such as, in particular, higher unsaturated fatty acids. It is furthermore possible to add other curable synthetic resins, for example phenoplasts or aminoplasts, to such lacquer resin formulations.

The curable mixtures according to the invention can be manufactured in the usual manner with the aid of known mixing equipment (stirrers, kneaders, rolls and the like).

The curable epoxide resin mixtures according to the invention are above all employed in the fields of surface protection, of the electrical industry and of laminating processes, and in the building industry. They can be used, in a formulation suited in each case to the particular end use, in the unfilled or filled state, if appropriate in the form of solutions or emulsions, as paints, lacquers, sintering powders, compression moulding compositions, injection moulding formulations, dipping resins, casting resins, impregnating resins, binders and adhesives, tool resins, laminating resins, sealing compositions and surface-filling compositions, floor covering compositions and binders for mineral aggregates.

The following epoxide resins were used for the manufacture of curable mixtures, described in the examples:

Epoxide Resin A

Polyglycidyl-ether resin (technical product) manufactured by condensation of diomethane (2,2-bis(p-hydroxyphenyl)-propane) with a stoichiometric excess of epichlorohydrin in the presence of alkali, which is liquid at room temperature, consists mainly of diomethane-diglycidylether of the formula

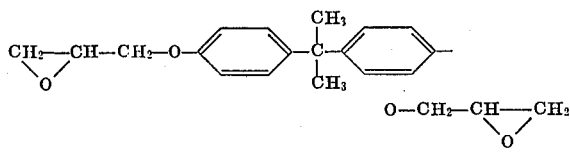

and has the following characteristics:
Epoxide content: 5.1 – 5.5 epoxide equivalents/kg
Viscosity (Hoeppler) at 25°C: 9,000 – 13,000 cP.

Epoxide Resin B

Diglycidyl-ether resin (technical product) manufactured by condensation of hydrogenated diomethane (2-,2-bis-(p-hydroxycyclohexyl)-propane) with a stoichiometric excess of epichlorohydrin in the presence of alkali, which is liquid at room temperature, consists mainly of hydrogenated diomethane-diglycidyl-ether of the formula

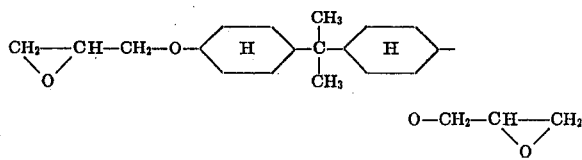

and has an epoxide content of 4.46 epoxide equivalents/kg.

Epoxide Resin C

Tetrahydrophthalic acid diglycidyl ester having the following characteristics:
Epoxide content: 6.45 equivalents/kg.
Viscosity (Hoeppler) at 25°C: 450 – 550 cP.

To determine the mechanical properties of the curable mixtures described in the examples which follow, sheets of size 135 × 135 × 4 mm were manufactured for the determination of the flexural strength, deflection and heat distortion point, and the test specimens corresponding to the standard specifications were manufactured from these sheets.

A. Manufacturing Examples

EXAMPLE 1 a. 5-Amino-2-methyl-2-(β-cyanoethyl)-5-cyclohexen-1-one (M. Cherubim and F. A. Dagga, Angew. Chem. 83, (1971) 896)

0.6 g of sodium is dissolved in 120 ml of tert. butanol by boiling for two hours, thereafter 35.6 g of 4-acetyl-4-methyl-pimelonitrile (Bruson, Riener, Journ. A.C.S. 64 (1942) 2850) are added and the mixture is boiled for 1½ hours under reflux. On cooling, crystals separate out from the clear solution and these are filtered off, washed with isopropanol and dried in vacuo at 80°C. Yield 19.14 g; melting point 154° – 156°C. Concentration of the filtrate on a rotary evaporator and recrystallisation of the residue from 20 ml of isopropanol yields a further 7.88 g of melting point 150° – 154°C.
Total yield 27.02 g (75.8%).

For analysis, 3.1 g were recrystallised from 20 ml of ethanol. Yield 2.8 g, melting point 157°–159°C.

| Analysis | $C_{10}H_{14}N_2O$ (M = 178.24) | | |
|---|---|---|---|
| Calculated | C 67.34 | H 7.91 | N 15.71 |
| Found | C 67.26 | H 8.25 | N 15.35. |

The NMR-spectrum in deuterated dimethylsulphoxide proves the structure.

| 2 $H_b$-singlet (broad) | 6.65 ppm |
|---|---|
| 1 $H_a$-singlet | 4.85 ppm |
| 2 $H_c$+2 $H_g$-multiplet | 2.2 – 2.7 ppm |
| 2 $H_d$+2 $H_f$-multiplet | 1.5 – 2.0 ppm |
| 3 $H_e$-singlet | 1.0 ppm |

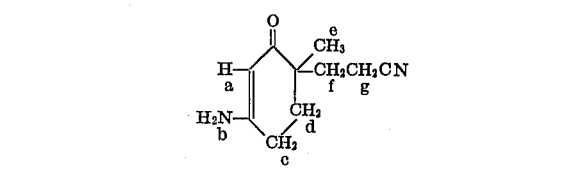

b. 7-Amino-4a-methyl-decahydro-quinoline 172 g of the 5-amino-2-methyl-2-(β-cyanoethyl)-5-cyclohexen-1-one (precursor) thus obtained are hydrogenated in 500 ml of ethanol and 150 g of gaseous ammonia in an autoclave in the presence of 20 g of Raney nickel at 120°C and a pressure of 150 atmospheres gauge, over the course of 4 hours. The catalyst is filtered off and the filtrate is concentrated on a rotary evaporator. Distillation in vacuo yields 130.4 g of crude amine (80.2% of theory) in which 80% of the main component can be detected by gas chromatography.

For analysis, a small amount was fractionated through a rotating strip column. Boiling point 123°C/13 mm Hg.

| Analysis | (M = 168.28): | | |
|---|---|---|---|
| Calculated | C 71.37 | H 11.98 | N 16.64 |
| Found | C 71.42 | H 11.96 | N 16.80. |

The mass spectrum shows the molecular peak at m/e 168.

EXAMPLE 2

7-Amino-decahydro-quinoline 114 g of 5-amino-2-(β-cyanoethyl)-5-cyclohexen-1-one in 350 ml of ethanol and 100 g of gaseous ammonia are hydrogenated over the course of 2 hours in an autoclave in the presence of 12 g of Raney nickel at 110°C and a pressure of 100 atmospheres gauge. After removing the catalyst and the solvent, the residue is fractionated through a Vigreux column, whereby 69.6 g of 7-amino-decahydro-quinoline of boiling point 108°–125°C at 12 mm Hg are obtained. The bulk of the material distils at 117°C/12 mm Hg. The amine is solid at room temperature and, as ascertained by a gas chromatogram, consists of at least two of the four possible stereoisomers.

The substance was analysed as the dipicrate: 150 g of picric acid and 500 mg of amine, after twice recrystallising from a mixture of ethanol and a little water, yield 1.19 g of dipicrate of melting point 246°–248°C (decomposition).

| Analysis | $C_{21}H_{24}N_8O_{14}$ (M = 612.47) | | |
|---|---|---|---|
| Calculated | C 41.18 | H 3.95 | N 18.30 |
| Found | C 40.87 | H 4.08 | N 18.01 |

EXAMPLE 3

7-Amino-4a-(γ-aminopropyl)-decahydro-quinoline 250 g of 5-amino-2,2-bis-(β-cyanoethyl)-5-cyclohexen-1-one in 850 ml of ethanol and 370 g of gaseous ammonia are hydrogenated over the course of 3 hours in an autoclave in the presence of 30 g of Raney nickel at 130°C and a pressure of 150 atmospheres gauge. The catalyst is removed by filtration, the filtrate is concentrated on a rotary evaporator and 199.6 g of crude amine of boiling point 93°–193°/0.6 mm Hg are isolated by distillation. For further purification, 147 g of crude amine are fractionated through a packed column, whereby 69.5 g of pure amine of boiling point 117°–121°/0.07 mm Hg are obtained.

| Analysis | $C_{12}H_{25}N_3$ (M = 211.34) | | |
|---|---|---|---|
| Calculated | C 68.19 | H 11.92 | N 19.88 |
| Found | C 68.46 | H 12.01 | N 19.94 |

B. Use Examples

EXAMPLE I

To manufacture a test specimen, the amine according to Manufacturing Example 1 was mixed with the epoxide resin A in the equivalent ratio of 1 : 1 at room temperature, and the mixture was briefly degassed in vacuo and then poured into a mould of size 200 × 200 × 4 mm. Thereafter the mixture was cured for 4 hours at 80°, 12 hours at 140° and 6 hours at 160°. Testing the material gave the following results:

Table 1

| Abbreviation | | |
|---|---|---|
| HDP | Heat distortion point (DIN 53,461) | 140°C |
| FS | Flexural strength (VSM 77,103) | 11.8 kg/mm² |
| D | Deflection (VSM 77,103) | 16.0 mm |

Comparison curing with ethylenediamine and isophoronediamine gave the following values:

Table 2

| | Ethylenediamine | Isophoronediamine |
|---|---|---|
| HDP | 117°C | 105°C |
| FS | 13.4 kg/mm² | 9.6 kg/mm² |
| D | 10.8 mm | 15.8 mm |

The amine according to Manufacturing Example 1 is hence superior to the commercially available amines ethylenediamine and isophoronediamine with regard to heat distortion point. As compared to ethylenediamine, improved flexibility is achieved.

The casting and curing experiment (relating to the amine according to Manufacturing Example 1) was repeated, except for the difference that instead of the epoxide resin A the epoxide resin B was employed in one case, and in a further experiment the epoxide resin C was employed. The test results are summarised in Table 3.

EXAMPLE II

The amines of Manufacturing Examples 2 and 3 were employed, in the manner described in Example I, as curing agents for the epoxide resin A. The test data determined are listed in Table 3. At the same time, all test data from Example I were also entered in Table 3.

Table 3

| Epoxide Resin | HDP, °C A | B | C | FS, kg/mm² A | B | C | D, mm A | B | C |
|---|---|---|---|---|---|---|---|---|---|
| Amine according to Example 2 | 136 | | | 12.7 | | | 13.4 | | |
| Amine according to Example 1 | 140 | 77 | 87 | 11.8 | 7.5 | 9.2 | 16.0 | 3.4 | 6.0 |
| Amine according to Example 3 | 161 | | | 10.1 | | | 12.3 | | |
| Ethylenediamine | 117 | 63 | 84 | 13.4 | 10.0 | 15.2 | 10.8 | 7.4 | 3.5 |
| Isophoronediamine | 105 | 93 | 115 | 9.6 | 7.1 | 12.4 | 15.8 | 2.7 | 4.5 |

We claim:

1. A 7-amino-decahydro-quinoline of the formula

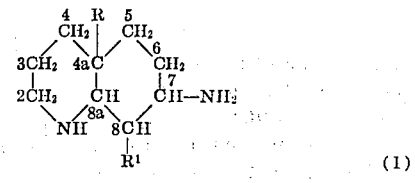

(1)

wherein R is hydrogen, alkyl of 1 to 5 carbon atoms, or γ-aminopropyl; and $R_1$ is methyl or hydrogen.

2. 7-Amino-4a-methyl-decahydro-quinoline.

3. 7-Amino-4a-(γ-aminopropyl)-decahydro-quinoline.

4. 7-Amino-decahydro-quinoline.

* * * * *